United States Patent
Sowers et al.

(10) Patent No.: US 6,819,109 B2
(45) Date of Patent: Nov. 16, 2004

(54) MAGNETIC DETECTOR EXTENDABLE WAND

(75) Inventors: Kenneth George Sowers, Frederick, MD (US); Donald Dale Sien, Leesburg, VA (US); Thomas Matthew Parker, Bethesda, MD (US)

(73) Assignee: Schonstedt Instrument Company, Kearneysville, WV (US)

( * ) Notice: Subject to any disclaimer, the term of this patent is extended or adjusted under 35 U.S.C. 154(b) by 147 days.

(21) Appl. No.: 10/348,998

(22) Filed: Jan. 23, 2003

(65) Prior Publication Data

US 2004/0145369 A1 Jul. 29, 2004

(51) Int. Cl.$^7$ .......................... G01V 3/11; G01V 13/00
(52) U.S. Cl. ................... 324/329; 324/326; D10/47
(58) Field of Search ....................... 324/326–329; 340/551; D10/46–47

(56) References Cited

U.S. PATENT DOCUMENTS

| | | | |
|---|---|---|---|
| D215,618 S | 10/1969 | MacCotter | |
| D218,705 S | 9/1970 | Doss | |
| D224,441 S | 7/1972 | Gardiner | |
| 3,769,575 A | 10/1973 | Rist et al. | |
| 3,823,365 A | 7/1974 | Anderson | |
| 3,894,283 A * | 7/1975 | Schonstedt | 324/345 |
| D255,552 S | 6/1980 | Schonstedt | |
| D274,607 S | 7/1984 | Schaefer et al. | |
| 4,488,115 A * | 12/1984 | Podhrasky | 324/329 |
| 4,520,317 A | 5/1985 | Peterman | |
| 4,818,944 A | 4/1989 | Rippingale | |
| 5,001,430 A | 3/1991 | Peterman et al. | |
| 5,043,666 A | 8/1991 | Tavernetti et al. | |
| 5,093,622 A | 3/1992 | Balkman | |
| 5,132,622 A * | 7/1992 | Valentino | 324/326 |
| 5,430,379 A | 7/1995 | Parkinson et al. | |
| 5,469,155 A | 11/1995 | Archambeault et al. | |
| 5,578,926 A | 11/1996 | Reinhardt | |
| D377,908 S | 2/1997 | Yue | |
| 5,644,237 A | 7/1997 | Eslambolchi et al. | |
| 5,680,048 A | 10/1997 | Wollny | |
| 5,686,828 A | 11/1997 | Peterman et al. | |
| 5,798,644 A | 8/1998 | Eslambolchi et al. | |
| 5,828,219 A | 10/1998 | Hanlon et al. | |
| D419,458 S | 1/2000 | Adolphs | |
| D459,245 S | 6/2002 | Power | |
| D459,246 S | 6/2002 | Power et al. | |

FOREIGN PATENT DOCUMENTS

DE        4318563 A1 * 12/1994     ............ G01V/3/08

OTHER PUBLICATIONS

"AN/PSS–14 Find the Mines Not the Clutter"—http://www.cyterracorp.com/CY–minedet–fr–HSTAMIDS.htm; http://www.cyterracorp.com/CY–minedet–fr–DualSensor.htm.*
"Garrett Hand Held Metal Detectors"—http://www.garrett.com/security/sec–pro–han.asp.*

* cited by examiner

Primary Examiner—Jay Patidar
Assistant Examiner—Darrell Kinder
(74) Attorney, Agent, or Firm—Lawrence R. Franklin (57) ABSTRACT

A wand-type magnetic metal detector has a telescoping wand which shortens the wand sufficiently for the detector to be comfortably carried in a holster carried on the user's body. The user's hands are thereby freed for other tasks than carrying the detector.

20 Claims, 9 Drawing Sheets

MAGNETIC DETECTOR EXTENDABLE WAND

BACKGROUND OF THE INVENTION

1. Field of the Invention

This invention relates to a metal detector wherein a wand is extendable and retractable between a full-sized state and a reduced, compact state. The full-sized state comprises the normal in-use condition. When the wand is retracted, the detector is compact enough to be comfortably carried with or without the use of the hands in the field for extended periods of time, preferably compact enough to fit in a holster attached to the belt of the user.

2. Description of Related Art

Metal detectors are used to locate and ofttimes trace underground or otherwise unseen metal objects, e.g., cables, pipes, land mines, boundary markers, etc. Many different sensor constructions are used to accomplish these purposes, but the designs of the detector bodies can broadly be divided into two categories: (1) a disc type in which a relatively flat sensor disc is attached to the bottom of a long, thin wand and a housing for the controls, display, and detector circuitry is attached to the top of the wand, and (2) a wand type in which the control and display housing is mounted atop a light but relatively bulky wand.

The former are characterized by the flat disc being held close to the ground and substantially parallel thereto, and the detector is carried by a handle located on the control and display housing remote from the disc. Because the weight of the detector is divided between the disc and the housing, which are widely separated from each other by the wand, a large moment of force is created. In order to minimize the fatigue produced thereby, it is common to design the wand to be slightly telescopic, so that the length of the wand may be adjusted to a limited extent in order to fit it to the height of the user, thus reducing the apparent weight of the detector. Representative of this type are the design patents to Doss (U.S. Pat. No. Des. 218,705), Gardiner (U.S. Pat. No. Des. 224,441), Schaefer et al. (U.S. Pat. No. Des. 274,607), Yue (U.S. Pat. No. Des. 377,908), and Adolphs (U.S. Pat. No. Des. 419,458) and the utility patents to Rist et al. (U.S. Pat. No. 3,769,575), Anderson (U.S. Pat. No. 3,823,365), and Wollny (U.S. Pat. No. 5,680,048). See Anderson, column 3, lines 8–12, and Wollny, column 4, lines 44–46, for teachings of adjusting the length of the wand. Rist et al. teaches making the wand in sections for easy disassembly and storage; column 3, lines 34–36. To inventors' knowledge, none of the disc type detectors teach nor disclose structure which will permit retracting the wand for easy carrying.

Wand-type metal detectors are characterized by a control, display, and circuitry housing being located atop a light wand. A handle is either built into the housing or extends laterally therefrom. The vast majority of the weight of the detector, therefore, is concentrated in the housing, so fatigue-producing moments of force are virtually nonexistent, and the detectors are easy to handle.

Another characteristic of wand-type metal detectors is that there are a plurality of sensors distributed about the detector body in a precise configuration. The orientation of the sensors are usually fixed relative to each other in order for the detector to work most efficiently.

Because of these two factors (concentration of weight in the housing and fixed orientation of the sensors), none of the known wand-type detectors have telescoping wands. The sensors are located differently for different purposes, but the housing/wand combinations are universally designed as integral and rigid. In some instances, the sensors are located both in the wand and the combination handle/circuitry housing atop the wand (Tavernetti et al., U.S. Pat. No. 5,043,666; Peterman et al., U.S. Pat. No. 5,001,430). In others, they are spaced apart in the wand, in the housing, and in wings extending from one or both (Peterman, U.S. Pat. No. 4,520,317). Finally, the most common wand-type detectors are those in which the sensors are spaced apart within the wand alone (Schondstedt, U.S. Pat. No. Des. 255,552; Power, U.S. Pat. No. Des. 459,245; Power et al., U.S. Pat. No. Des. 459,246; Rippingale, U.S. Pat. No. 4,818,944; Balkman, U.S. Pat. No. 5,093,622; Parkinson et al., U.S. Pat. No. 5,430,379; Archambeault et al., U.S. Pat. No. 5,469,155; Reinhardt, U.S. Pat. No. 5,578,926; Eslambolchi et al., U.S. Pat. No. 5,644,237 and U.S. Pat. No. 5,798,644; and Hanlon et al., U.S. Pat. No. 5,828,219).

Figure 1:
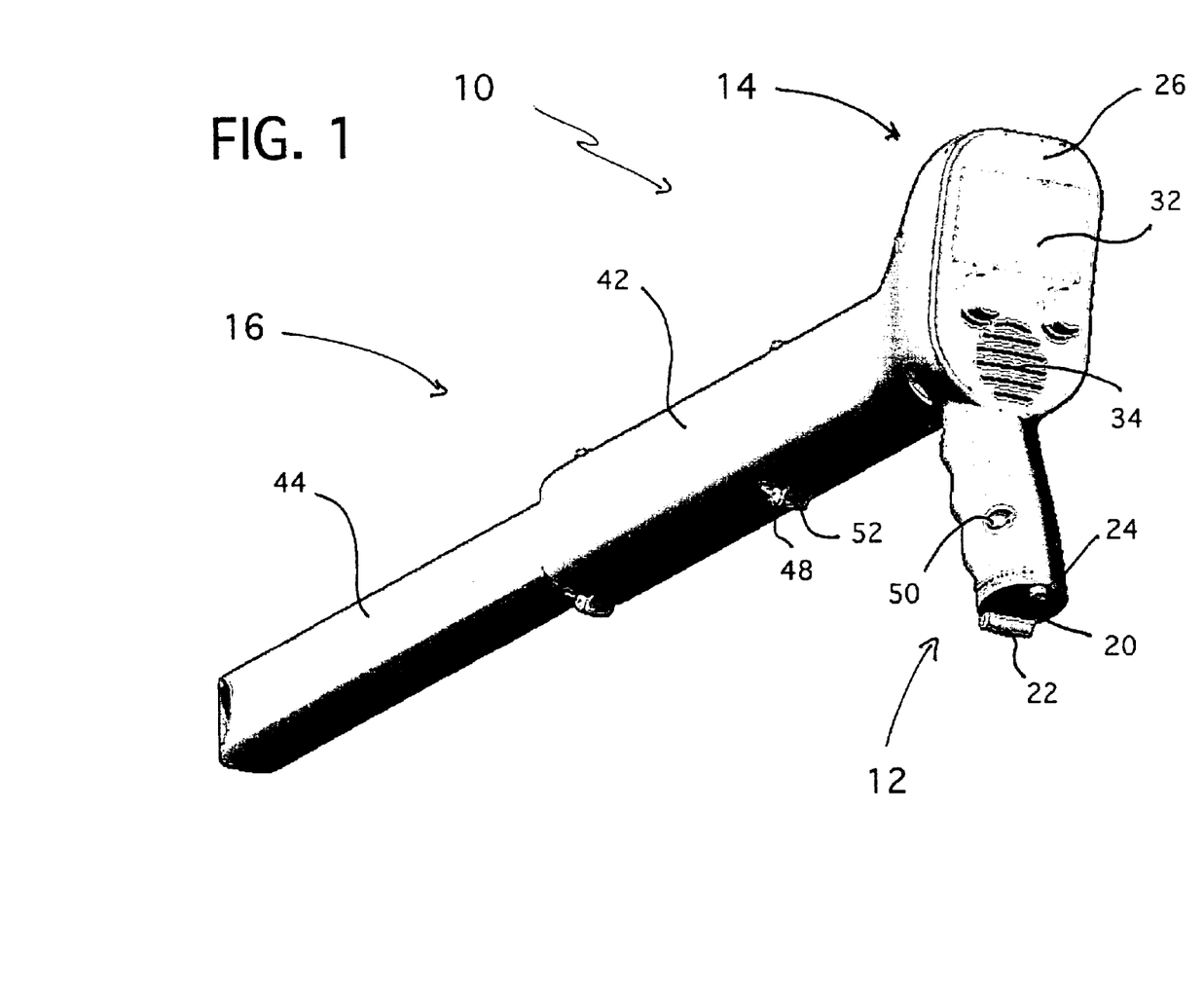
FIG. 1 is a perspective view of the detector with the wand extended which illustrates a preferred embodiment of the present invention.
Figure 2:
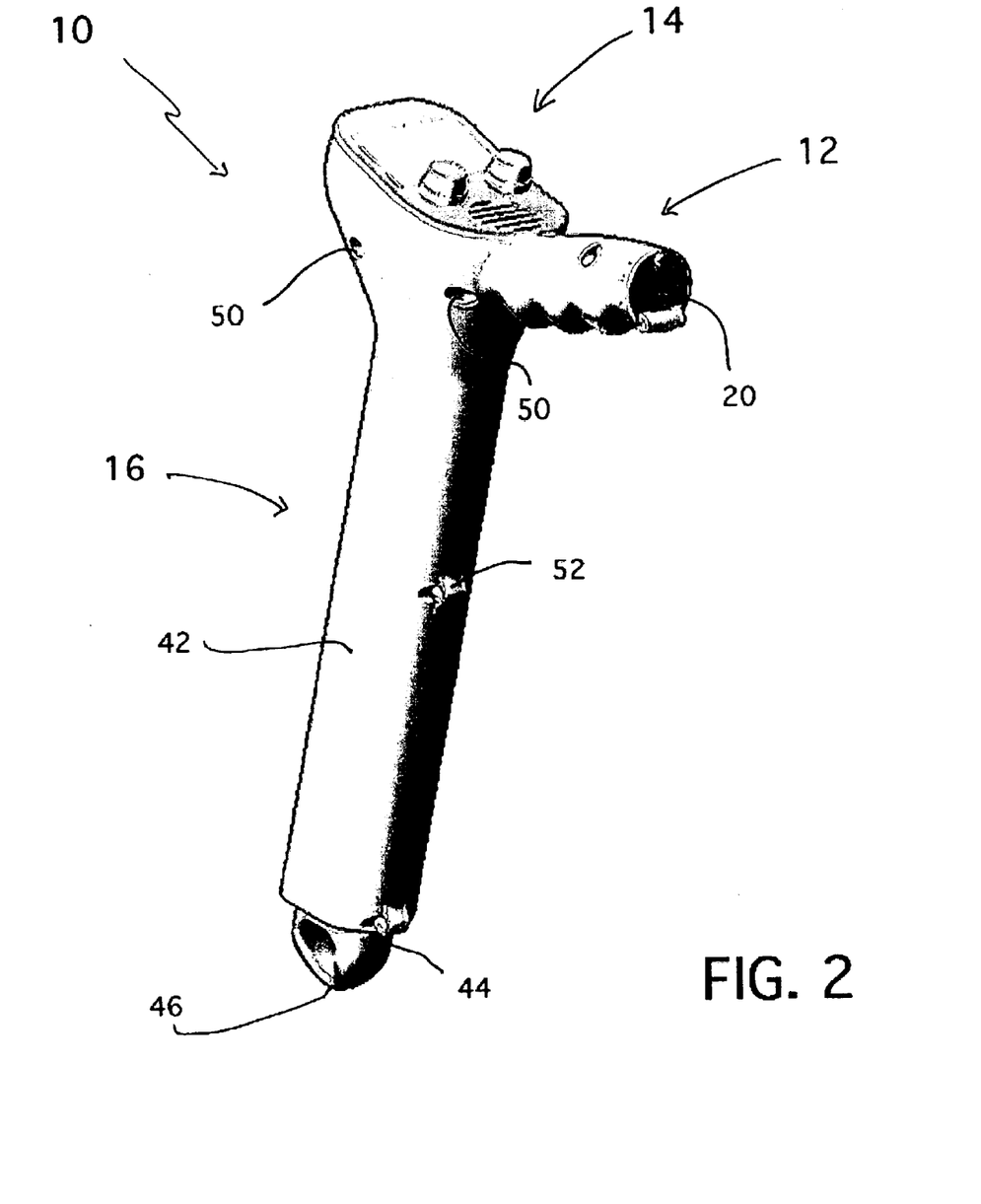
FIG. 2 is a perspective view of the detector with the wand retracted which illustrates a different state of the preferred embodiment of the present invention.
Figure 3A:
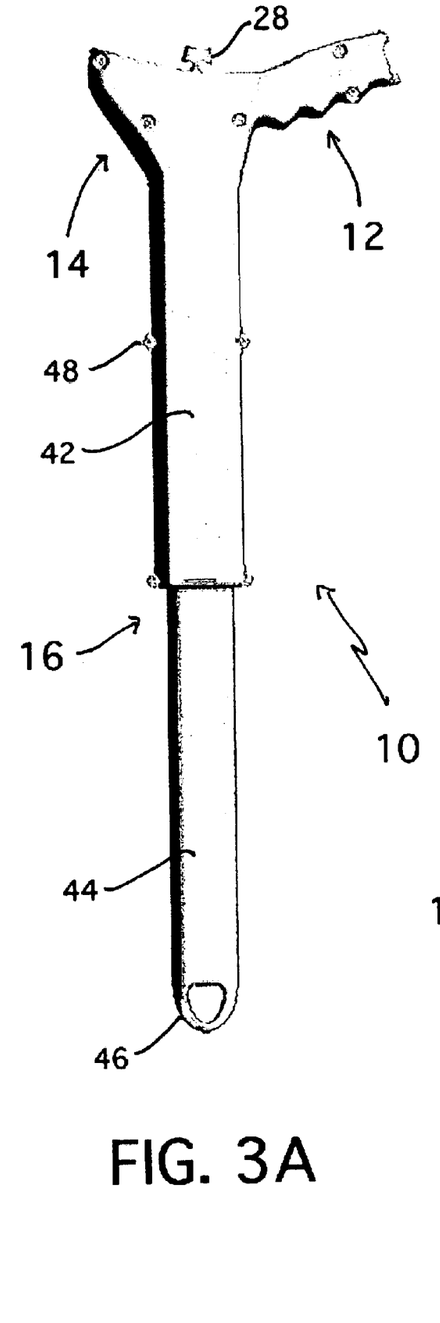
FIGS. 3A and 3B are left side views of the inventive detector of FIG. 1 with the wand extended and retracted, respectively.
Figure 3B:
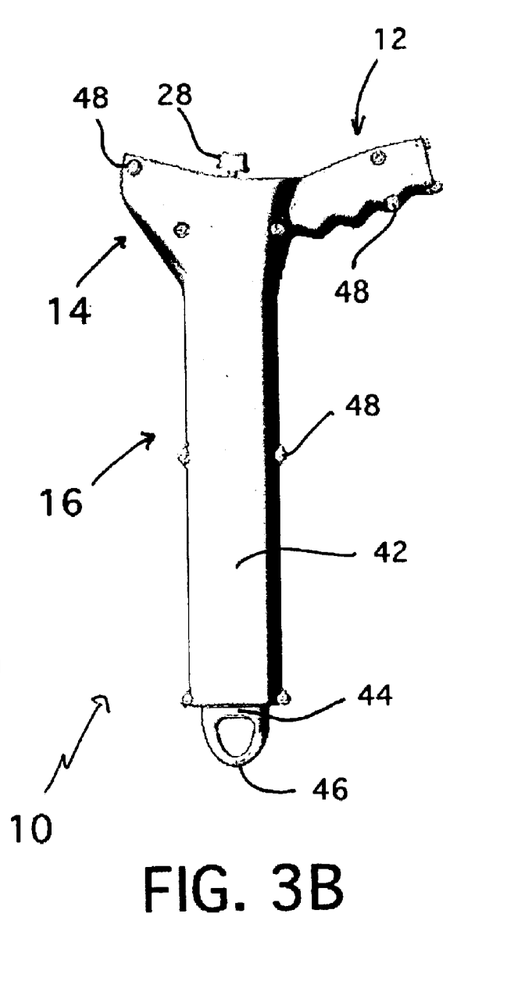
Figure 4A:
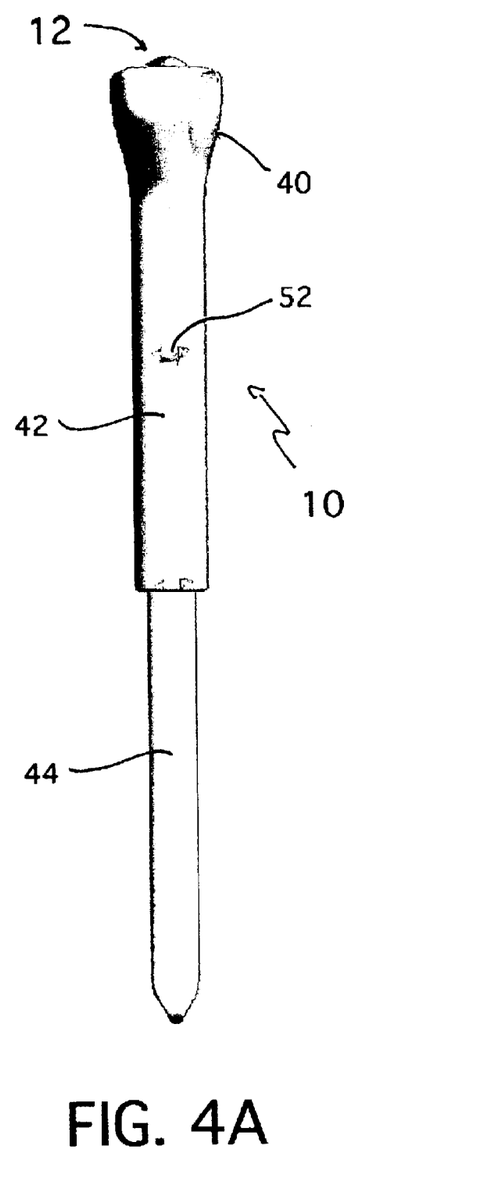
FIGS. 4A and 4B are front views of the inventive detector of FIG. 1 with the wand extended and retracted, respectively.
Figure 4B:
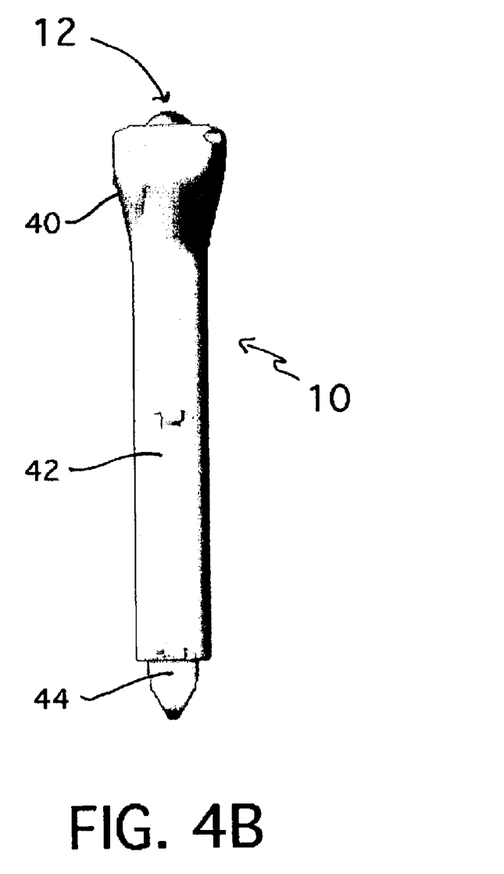
Figures 5A, 5B:
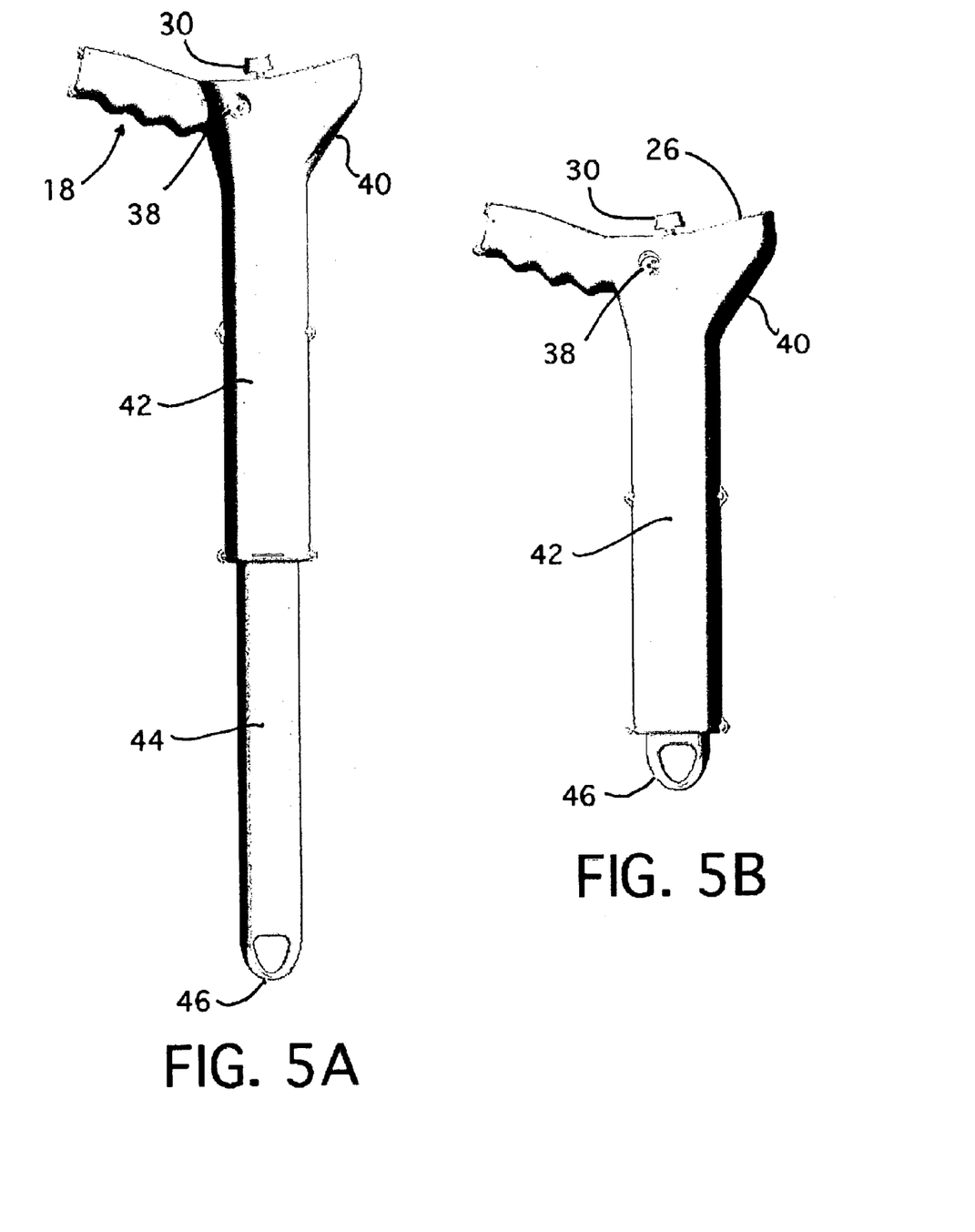
FIGS. 5A and 5B are right side views of the inventive detector of FIG. 1 with the wand extended and retracted, respectively.
Figure 6A:
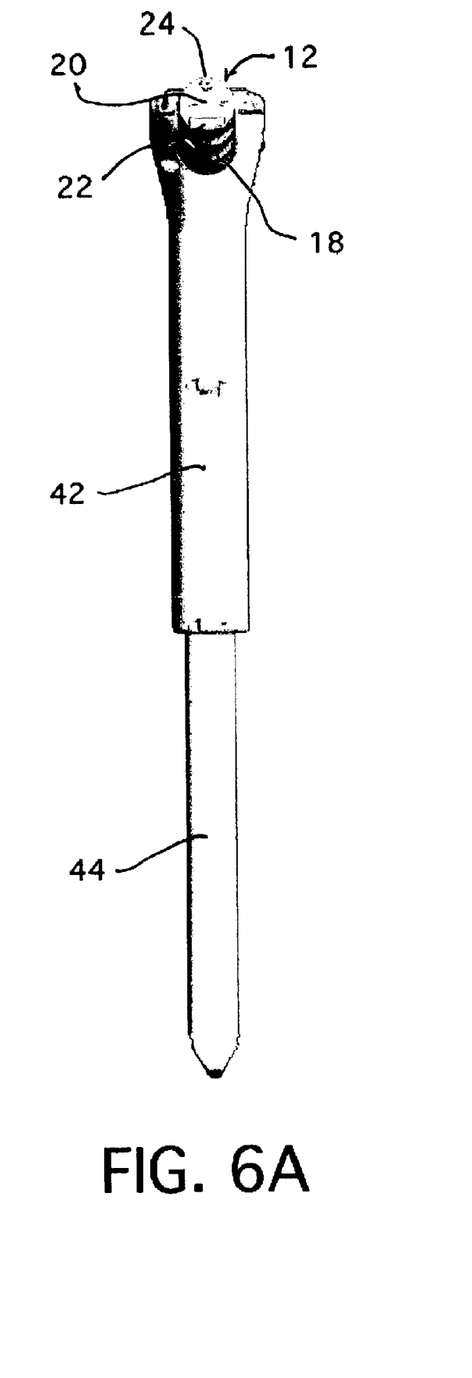
FIGS. 6A and 6B are back views of the inventive detector of FIG. 1 with the wand extended and retracted, respectively.
Figure 6B:
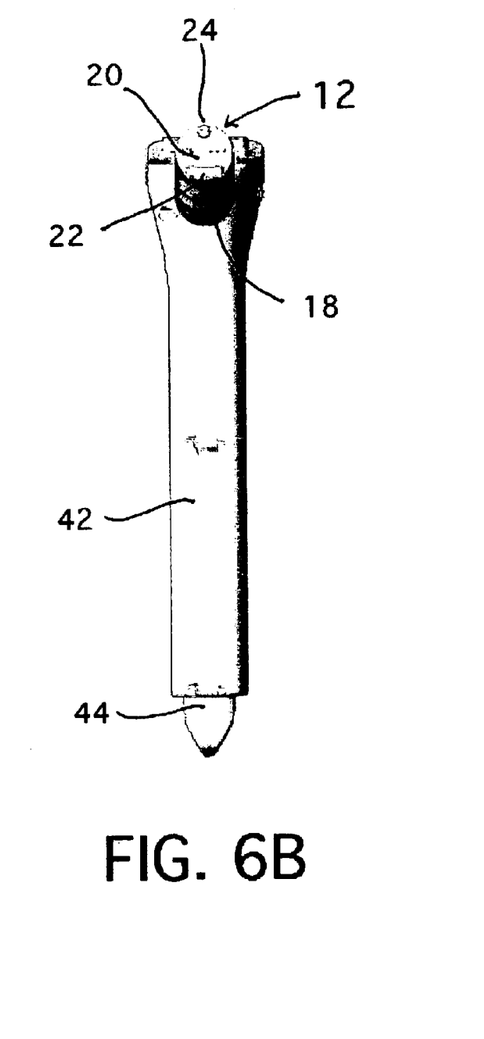
Figure 7:
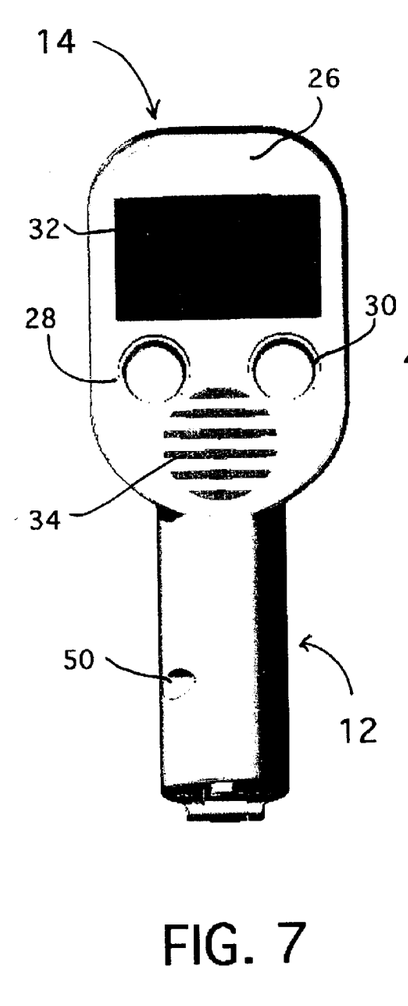
FIG. 7 is a top view of the inventive detector of FIG. 1.

In one apparent exception to the rigid wand standard, the patent to Peterman et al., U.S. Pat. No. 5,001,430, shows in FIG. 1 a wand which appears to be in two sections having different diameters with a ferrule located at the intersection of the two. The combination resembles the adjusting mechanism for the legs of a photographic tripod, wherein rotation of the ferrule locks or releases the legs for telescopic adjustments. The specification makes no mention of the feature, however, so all assumptions concerning its structure and functions are nothing but guesswork. To complicate matters, the specification speaks only of the wand in the singular as if it consists of only one piece. And, the specification requires the sensors located on opposite sides of the ferrule to be fixed relative to each other, which further suggests the housing and wand are all of one piece construction. The reasonable conclusion drawn by one skilled in the art is that the wand is non-telescopic regardless of the drawing. Whatever "teaching" the inventors intended by the drawing is lost in the confusion.

All patents mentioned herein are of record.

It is common, when searching for isolated, passive objects buried underground, as with a magnetic detector, to be forced to carry a metal detector for long periods of time over a variety of landscapes, some so rugged that both hands are needed to get through them. To date, the user has been required to constantly carry the detector in one or both hands. Even detectors which are comfortable at first become uncomfortable to carry in time. A detector which is sufficiently compact in size such that it can be transported comfortably for extended periods of time with one hand would be a distinct improvement. One which can be comfortably transported without the use of either hand would meet the needs of those in the art. The disclosed invention satisfies these needs.

OBJECTS AND SUMMARY OF THE INVENTION

The present invention overcomes the difficulties described above by providing a metal detector with a retractable/extendable wand, such that when retracted, the detector is sufficiently compact as to be carried comfortably in the field with and preferably without the use of hands.

It is an object of the invention to provide a metal detector which can be reduced in size sufficiently to fit within a holster provided therefor.

It is a further object of the invention to provide a metal detector which can be carried for long periods of time without tiring.

It is a further object of the invention to provide a metal detector which can be retracted for easy carrying and for facilitating the storage thereof.

BRIEF DESCRIPTION OF THE DRAWINGS

The foregoing and other objects, aspects, uses, and advantages of the present invention will be more fully appreciated as the same becomes better understood from the following detailed description of the present invention when viewed in conjunction with the accompanying drawings, in which.

DETAILED DESCRIPTION OF THE PREFERRED EMBODIMENT

Referring to FIGS. 1-9, magnetic metal detector 10 is shown in various views from perspective through front, back, top, bottom, left-side and right-side, and in cross-section. Detector 10 comprises a handle 12, a control and display housing 14, and a wand 16.

Figures 9A, 9B:
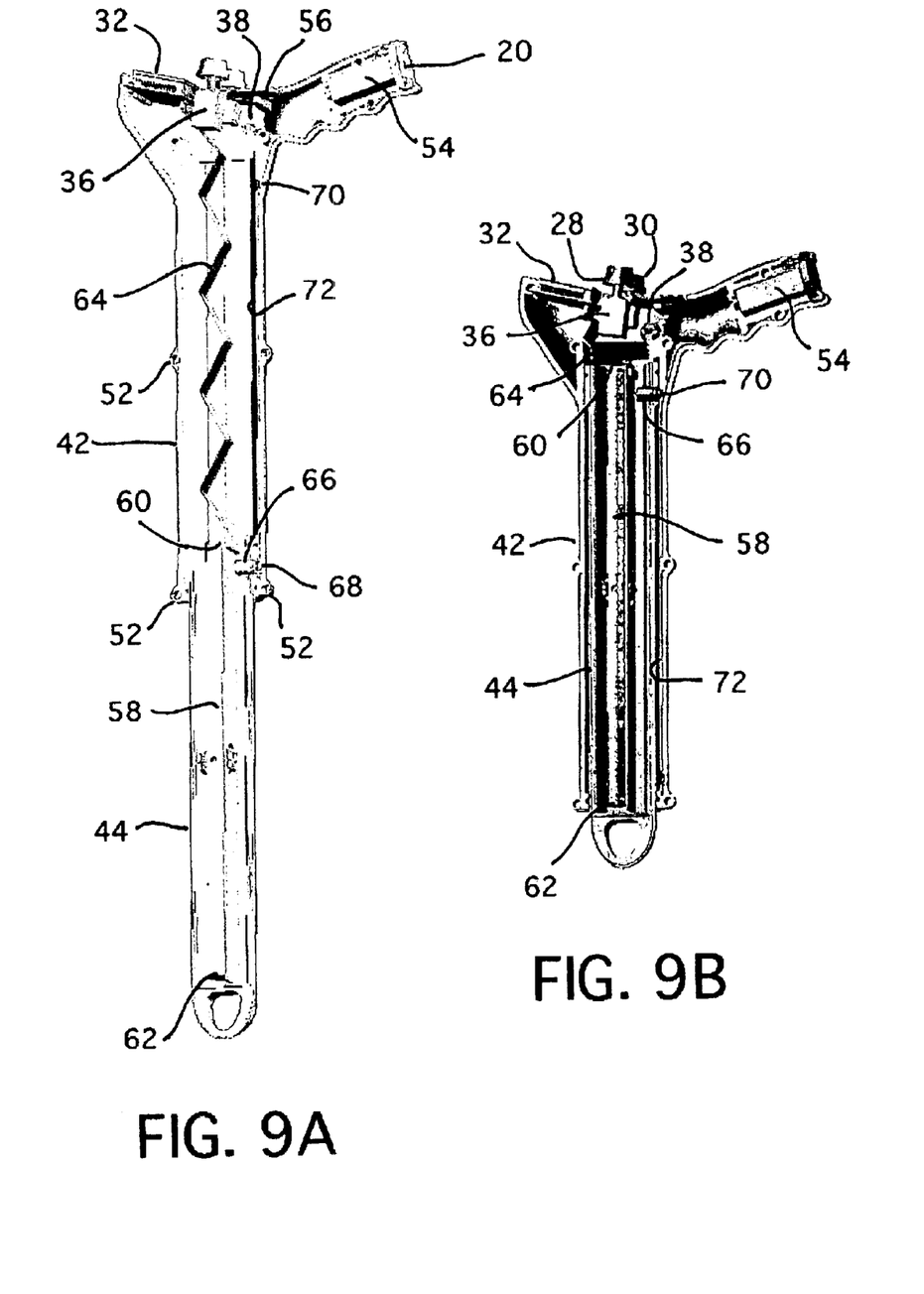
FIGS. 9A and 9B are cross-sectional, left side views of the inventive detector of FIG. 1 with the wand extended and retracted, respectively.

Handle 12 is generally circular in cross-section (FIG. 6) and is externally molded to include an undulating grip 18 to aid in securing a non-slip purchase of the handle. A cap 20 is attached to the end of handle 12 to close the hollow interior thereof (FIGS. 9A-9B). Preferably, cap 20 is attached to handle 12 by a hinge 22 and secured in the closed state by a screw 24, but any convenient means for alternately closing and providing access to the interior is acceptable. Screw 24 preferably has an enlarged head with a kerf formed thereacross (FIGS. 1-2) for use with a screwdriver or a dime. It is contemplated, however, that screw 24 be a thumb-screw with a knurled head or even a wing-nut (not shown).

Control and display housing 14 (FIGS. 1 and 7) comprises a substantially flat, generally rectangular top surface 26 which includes a pair of control knobs 28 and 30 (FIGS. 3, 5, and 7), a display screen 32, and a speaker grating 34. The control knobs 28 and 30 function to turn on and off the detection circuitry 36 (FIGS. 9A-9B), to control the volume of its audio output, and to control its gain. Display screen 32 provides the visual output of detection circuitry 36. A headphone jack 38 (FIGS. 5A-5B, 8, and 9A-9B) is provided on a sidewall 40 of control and display housing 14 for receiving the plug of a headphone when its use is desired. Jack 38 is shown on the right side of sidewall 40, but it is obvious it can be located anywhere convenient on control and display housing 14.

Wand 16 comprises a fixed body portion 42 and a sliding portion 44 which is surrounded by body portion 42 and telescopically slides within body 42 from an extended state (FIGS. 1, 3A, 4A, 5A, 6A, and 9A) to a retracted, compact state (FIGS. 2, 3B, 4B, 5B, 6B, and 9B). This relationship is preferred, since it provides the most protection for the moving element, the most vulnerable of the two to damage. Clearly, however, the orientation of body 42 and slide 44 can be reversed with the movable slide portion enveloping the fixed body portion and sliding outside thereof.

Figure 8:
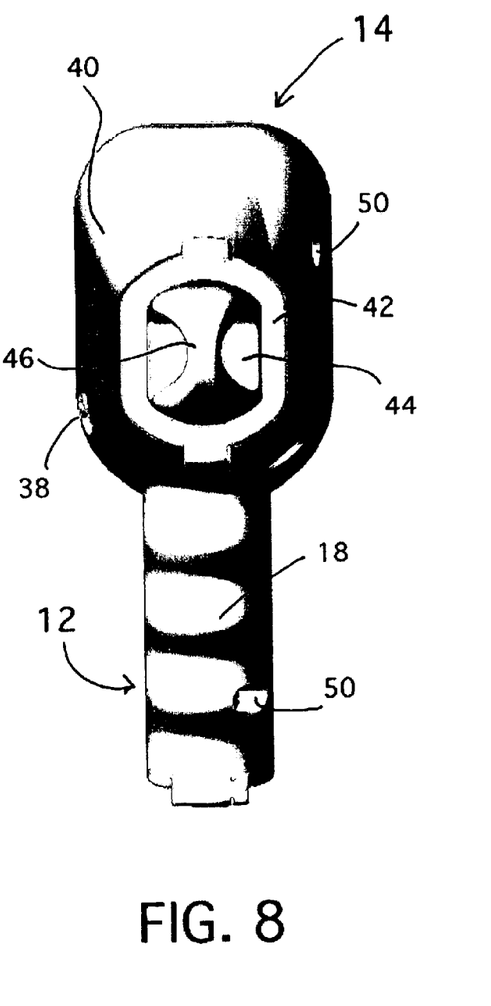
FIG. 8 is a bottom view of the inventive detector of FIG. 1.

Body portion 42 is fixed relative to control and display housing 14 and handle 12, preferably being integrally molded therewith. Sidewall 40 of control and display housing 14 tapers (FIGS. 4-5) from the rectangularly-shaped top 26 to the generally oval-shape of body portion 42 (FIG. 8). While wand 16 is shown as generally oval in cross-section, it is clear it can be any shape which will permit longitudinal sliding of slide 44 within body 42 while resisting relative rotation therebetween, either having a non-circular cross-section or a circular one with a mating key/slot combination (not shown). Slide 44 terminates in a pull-loop 46 through which a finger or thumb may be inserted to alternately extend and retract slide 44.

Preferably, handle 12, control and display housing 14, and body portion 42 of wand 16 are fabricated as two mating clam-shells which are removable secured together by screws 48 received in cavities 50 in handle 12 and control and display housing 14 (FIGS. 1-2 and 7-8) and through ears 52 in body portion 42 of wand 16 (FIGS. 1-2, 3A-B, 5A-B, and 9A-B). Slide 44 is preferably fabricated to be tubular with a closed bottom, an open top, and a smooth exterior, as shown in the various FIGURES.

Referring to FIGS. 9A and 9B, the interior components of magnetic metal detector 10 are shown. Handle 12 is hollow and stores a battery 54 for powering detection circuitry 36 and a piezoelectric speaker 56. Cap 20 opens to allow replacement of battery 54. A detector sensor retainer 58 is fixedly mounted within slide 44 for movement therewith between the extended and retracted positions (FIGS. 9A and 9B, respectively). A pair of detector sensors (not shown) are located a fixed distance apart at the top and bottom ends 60 and 62, respectively, of sensor retainer 58. In order to ensure a continuous electrical connection between detection circuitry 36 and the pair of detector sensors throughout its movements, a flexible, accordion-style folding cable 64 is provided. Cable 64 unfolds when slide 44 is extended (FIG. 9A) and folds into a compact bundle when slide 44 is retracted (FIG. 9B).

Slide 44 is releasably held in the extended and retracted orientations by a detent 66, preferably a spring-biased ball, which fits into a lower recess 68 when the slide is extended and in an upper recess 70 when the slide is retracted. In between these extreme locations, detent 66 rides on a smooth surface 72.

It is noted that detector 10 functions efficiently at any position, whether fully extended, fully retracted, or any position in between. With the sensors fixed at the ends of the rigid, one-piece, sensor retainer 58, their relative orientation is fixed. Inasmuch as they are also in continuous electrical connection with detection circuitry 36, they are always in an "in use" state. Detector 10 is normally used in its fully extended state, because this length better fits adults. Referring to the fully extended state as the "in use" state is for convenience only and is not intended to limit the invention in any way.

Figure 10:
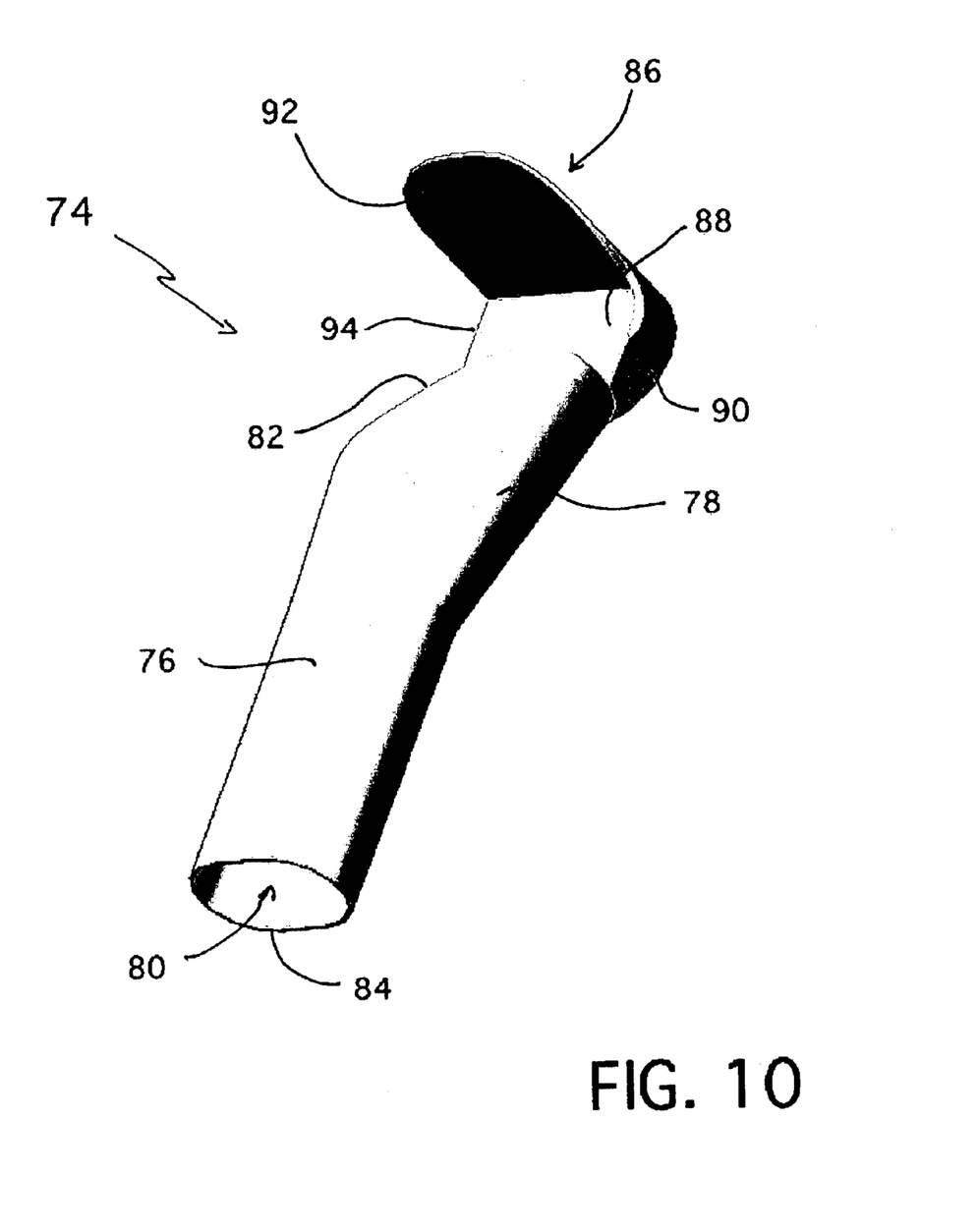
FIG. 10 is a diagrammatic perspective depiction of a holster used with the inventive detector.

FIG. 10 is a diagrammatic perspective of a holster 74 representative of those which is used with the inventive detector 10. Holster 74 comprises a tubular body 76 which is integral with a funnel-shaped torso 78. A hollow interior 80 extends therethrough and is open through both the top and bottom edges 82 and 84, respectively. Body 76 receives wand 16 of detector 10 and funnel-shaped torso 78 receives and supports tapering sidewall 40 of control and display housing 14. A cover 86 is hinged to top edge 82 of torso 78. Cover 86 comprises a top 88 which covers top surface 26 of detector 10, a front flange 90 which, in combination with torso 78, protects the front of housing 14, and a flap 92 for covering the exposed side of housing 14 and for constraining detector 10 within holster 74. A latch (not shown) maintains flap 92 in its closed, protective position. The latch is preferably mating Velcro™ strips, but any releasable latch, e.g., snaps, buckles, magnets, etc., will do. Cover 84 has no flange depending from its rear edge 94 to permit handle 12 to protrude therethrough when flap 92 is closed.

Holster 74 is attached to the user's body, so that neither hand is needed to carry detector 10. Any means (not shown) for attaching holster 74 is within the purview of the invention. Typically, a belt loop is provided on the remote side of holster 74, so that it can be mounted and carried on the user's belt. It is also contemplated to include a separate belt attached to holster 74, which belt is strapped to the waist or suspended from the shoulder of the user. Or, a system of belts can be wrapped around the torso and/or the shoulders. Also, a clip attached to holster 74 can be provided to clip onto the user's belt, waistband, or other item of apparel.

Holster 74 is preferably made of a fabric, e.g., canvas, Nylon™, etc., but it may also be made of any other suitable material, such as being integrally molded of plastic with a living hinge being formed between torso 78 and cover 86.

The manner of using magnetic metal detector 10 is obvious from its description. Retracting wand 16 to a compact state imbues detector 10 with benefits not enjoyed by prior art metal detectors. When wand 16 is extended, its length is a maximum, and the moments of force created by the increased lever arms make detector 10 appear heavier than it actually is. When slide 44 is retracted, however, the length of wand 16 is at its minimum, and although the weight of detector 10 does not change, it is easier to carry for extended periods of time.

As aforementioned, prior art detectors have been telescopically adjustable to fit the wand's length to the height of the user. The intended effect is to allow the user to stand upright without having to bend over. The reduction in length of wand is insufficient to render the detector compact enough to make it easy to carry comfortably for long periods of time.

The instant invention provides a different functional result, namely, the apparent weight of the detector is reduced. Although both are produced by a telescopic adjustment of the wand, the difference is more than just one of degree, for the adjustment must be sufficient to cause a significant reduction in size. Prior art telescopic wands have not gone far enough.

While the invention has been described in terms of a wand type magnetic metal detector, because of this difference in functional result, the invention is applicable to other types of metal detectors and said applicability is considered to be within the scope of the appended claims. None of the disc- nor wand-type metal detectors known to the inventors is constructed to retract into a compact state for easy carrying. Nor is there any teaching of the concept in the metal detector art.

The length of detector 10, when wand 16 is extended, is preferably on the order of two to two and a half feet. The extended length of the disclosed embodiment is about twenty-six (26) inches from control knobs 28 and 30 to pull-loop 46, but it is contemplated to provide variations in length to fit different human beings, much like providing different sizes of shoes. When retracted, the length of the disclosed detector 10 is about fifteen to sixteen inches, specifically 15.75 inches. In its compact state, then, the length, and thereby the effective size, of detector 10 has been reduced to about sixty percent (60%). For the purpose of defining "compact state" as a legal term, a detector is said to be in a "compact state" when it is reduced in length by any amount within the range of seventy-five to fifty percent (75–50%) of its extended length. From a functional standpoint, the closer the reduction in length to fifty percent, the better, for it is then easier to carry the detector comfortably.

An additional benefit from being in a compact state is that detector 10 can be carried in a holster, such as holster 74. When both hands are required for other duties, slide 44 is retracted, and wand 16 is inserted into holster 74. When needed for finding or tracing an underground metallic object, detector 10 is withdrawn from holster 74, and slide 44 is extended. No one in the metal detecting field, to the inventors' knowledge, have employed a holster to carry their detectors.

The inventive concept comprises the reduction of the length of the wand, and thereby the overall length of the detector, to a compact state. In the disclosed embodiment, presently considered as the best mode of carrying out the invention, wand 16 is telescopically extended and retracted, but the invention is by no means limited thereto. Other means for achieving the same end are within the scope of the appended claims. For example, one or more hinges may be included intermediate the ends of wand 16, so that wand 16 may be retracted by folding segments thereof into a compact bundle. Also, the tubular body of wand 16 may be made of a flexible, resilient material capable of being rolled into a flat disc, similar to a rolled-up fire hose, and secured in that compact configuration. Unlatching the roll would allow the wand to resume its original shape. Other methods will readily occur to those skilled in the art.

It is further contemplated that one of the sensors in the pairs of vertically aligned sensors can be located in either the control and display housing 14 or the fixed body portion 42 of wand 16 while the other is located in slide 44 of wand 16, so long as the two sensors are spaced apart the proper distance and in vertical, linear alignment with sufficient precision that the detector functions properly.

It can be seen, therefore, that the invention is not limited to magnetic field detectors but can find applicability and utility in other types of metal detectors as well.

Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention as defined in the appended claims.

Further, the purpose of the foregoing Abstract is to enable the U. S. Patent and Trademark Office, and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of the application, which is measured solely by the claims, nor is intended to be limiting as to the scope of the invention in any way.

It can be seen from the above that an invention has been disclosed which fulfills all the objects of the invention. It is to be understood, however, that the disclosure is by way of illustration only and that the scope of the invention is to be limited solely by the following claims:

We claim:

1. A metal detector, comprising:
   a control and display housing;
   a handle connected to said housing;
   a wand connected to said housing;
   a plurality of metal detecting sensors contained within said detector; and
   said wand being extendable and retractable from an extended state to a compact state, respectively.

2. The metal detector of claim 1 wherein said wand comprising a fixed portion integral with said housing and a sliding portion telescopically movable within said fixed portion.

3. The metal detector of claim 2 wherein said sliding portion of said wand is movable between said extended state and said compact state.

4. The metal detector of claim 3 wherein said wand includes a detent for alternately, releasably holding said sliding portion in said extended state and said compact state.

5. The metal detector of claim 4 wherein said detent comprises a spring-biased ball and a pair of recesses, said ball being on one of said fixed portion said sliding portion, said pair of recesses being located on the other of said fixed portion said sliding portion, and a smooth surface formed between said pair of recesses.

6. The metal detector of claim 1 wherein said control and display housing includes an on-off switch, a volume control, and a gain control.

7. The metal detector of claim 6 wherein said control and display housing further includes a visual display and an audio display.

8. The metal detector of claim 1 wherein said handle has a hollow interior, contains a battery in said hollow interior, and includes a cap openable to provide access to said interior.

9. The metal detector of claim 1 wherein said metal detector is a magnetic metal detector.

10. The metal detector of claim 1 wherein said plurality of sensors comprises a pair of sensors which are fixed in said sliding portion of said wand.

11. The metal detector of claim 10 wherein said pair of sensors are precisely spaced apart in a retainer, and said retainer is fixed in said sliding portion of said wand.

12. The metal detector of claim 1 wherein said compact state comprises a reduction in length of said detector by an amount within the range of seventy-five to fifty percent (75–50%) of said detector's extended length.

13. The metal detector of claim 12 wherein said compact state comprises a reduction in length of said detector by an amount within the range of sixty-five to sixty percent (65–60%) of said detector's extended length.

14. The combination of a metal detector and a holster therefor, comprising:
    a metal detector, comprising:
        a control and display housing;
        a handle connected to said housing;
        a wand connected to said housing said wand being extendable and retractable from an extended state to a compact state, respectively; and
        a plurality of metal detecting sensors contained within said detector; and
    a holster, said holster comprising:
        a body portion for receiving said metal detector; and
        a cover hinged to said body portion for covering the exposed portions of said control and display housing and for constraining said metal detector within said holster.

15. The combination of claim 14 wherein said metal detector comprises a wand-type metal detector.

16. The combination of claim 15 wherein said wand comprises a fixed portion integral with said housing and a sliding portion telescopically movable within said fixed portion.

17. The combination of claim 15 wherein said body of said holster portion has a hollow interior which extends therethrough and is open through both its top and bottom edges.

18. The combination of claim 15 wherein said a control and display housing tapers from a rectangular upper surface to a cylindrical wand, and said body portion of said holster comprises a tubular portion and a funnel-shaped portion, said tubular portion housing said wand and said funnel-shaped portion housing said control and display housing.

19. The combination of claim 15 wherein said cover comprises a top which covers the top surface of said metal detector, a front flange which covers and protects the front of said control and display housing, and a flap depending from said top of said cover which covers and protects the exposed side surface of said control and display housing.

20. The combination of a wand-type metal detector and a holster therefor, comprising:
    (1) a wand-type metal detector, comprising:
        a control and display housing;
        a handle connected to said housing;
        a wand connected to said housing;
        a plurality of metal detecting sensors contained within said detector; and
        said wand comprising a fixed portion integral with said housing and a sliding portion telescopically movable within said fixed portion; and
    (2) a holster, said holster comprising:
        a body portion for receiving said metal detector, said body portion comprising a tubular portion and a funnel-shaped portion, said tubular portion housing said wand and said funnel-shaped portion housing said control and display housing;
        said body portion having a hollow interior which extends therethrough and is open through both its top and bottom edges; and
        a cover hinged to said body portion, said cover comprising a top which covers the top surface of said metal detector, a front flange which covers and protects the front of said control and display housing, and a flap for covering the exposed side of said control and display housing and for constraining said metal detector within said holster.

* * * * *